US009774453B2

(12) United States Patent
Baldwin et al.

(10) Patent No.: US 9,774,453 B2
(45) Date of Patent: Sep. 26, 2017

(54) SYSTEM AND METHOD FOR PROVIDING AN AUTOMATED BIOMETRIC ENROLLMENT WORKFLOW

(71) Applicant: Northrop Grumman Systems Corporation, Falls Church, VA (US)

(72) Inventors: Taylor D. Baldwin, Newark, DE (US); Gregory T. Zarroli, Midlothian, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 14/676,468

(22) Filed: Apr. 1, 2015

(65) Prior Publication Data

US 2016/0294557 A1    Oct. 6, 2016

(51) Int. Cl.
*G06K 9/00* (2006.01)
*H04L 9/32* (2006.01)
*G06K 9/03* (2006.01)

(52) U.S. Cl.
CPC ........ *H04L 9/3231* (2013.01); *G06K 9/00912* (2013.01); *G06K 9/00926* (2013.01); *G06K 9/036* (2013.01)

(58) Field of Classification Search
CPC ............... H04L 9/3231; G06F 21/32; G06F 2221/2117; G06K 9/00892; G06K 9/036; G06K 9/00926; G06K 9/00912
USPC .......................... 382/115, 117, 118, 124, 313
See application file for complete search history.

(56) References Cited

U.S. PATENT DOCUMENTS

| 7,188,362 | B2* | 3/2007 | Brandys ............... G06Q 20/341 |
| | | | 713/185 |
| 8,254,647 | B1* | 8/2012 | Nechyba ............ G06K 9/00248 |
| | | | 382/118 |
| 8,255,697 | B2* | 8/2012 | Mathiassen ........... B60R 25/252 |
| | | | 382/124 |
| 9,100,825 | B2* | 8/2015 | Schultz .................... G06F 21/32 |
| 9,202,100 | B2* | 12/2015 | Wolfer ............... G06K 9/00013 |
| 9,292,726 | B2* | 3/2016 | Thorsted ............ G06K 9/00026 |
| 9,514,349 | B2* | 12/2016 | Weber ................... G06F 1/1626 |
| 2003/0051138 | A1* | 3/2003 | Maeda ..................... G06F 21/32 |
| | | | 713/168 |

(Continued)

*Primary Examiner* — Daniel Mariam
(74) *Attorney, Agent, or Firm* — Andrews Kurth Kenyon LLP; Sean S. Wooden

(57) ABSTRACT

Disclosed are automated biometric enrollment workflow (ABEW) systems and method implemented on a mobile communications device that includes a processor, memory and a display. The method is executed by the processor and includes opening of ABEW user interface (UI), initiating automated biometric enrollment workflow in which first biometric mode of the automated biometric enrollment workflow is started, a biometric sensor/scanner connected to mobile communications device scanning or reading a first biometric, wherein the first biometric is associated with the first biometric mode, analyzing the quality of the read/ scanned first biometric, determining if the quality is sufficient, if the quality is insufficient, repeating the scanning/ reading, analyzing and determining for the first biometric until the quality of the first biometric is sufficient and if the quality is sufficient, storing the first biometric.

18 Claims, 7 Drawing Sheets

(56) References Cited

U.S. PATENT DOCUMENTS

| | | | |
|---|---|---|---|
| 2005/0270140 A1* | 12/2005 | Oh | G06K 9/6255 340/5.83 |
| 2009/0097719 A1* | 4/2009 | Lim | G06F 21/32 382/124 |
| 2011/0090541 A1* | 4/2011 | Harper | G06F 21/32 358/474 |
| 2014/0037155 A1* | 2/2014 | Faria | H04L 9/3231 382/118 |
| 2014/0313007 A1* | 10/2014 | Harding | G07C 9/00134 340/5.52 |
| 2015/0074615 A1* | 3/2015 | Han | G06K 9/00033 715/863 |
| 2016/0087977 A1* | 3/2016 | Durkan | H04L 63/0861 726/6 |
| 2017/0032169 A1* | 2/2017 | Pi | G06K 9/00026 |

* cited by examiner

SYSTEM AND METHOD FOR PROVIDING AN AUTOMATED BIOMETRIC ENROLLMENT WORKFLOW

BACKGROUND

Current biometric enrollment is either performed on 1) a tactical biometric collection device (e.g., a CrossMatch SEEKII™ or Cogent Fusion™) or on 2) a generic office workstation with attached biometric collection peripherals as used throughout the Department of Homeland Security (DHS) to vet and enroll personnel in the Homeland Security Presidential Directive 12 (HSPD-12) Personal Identity Verification (PIV) compliant identity card issuance process.

1) Constructed as a single-purpose, single-unit collection device, existing biometric capture devices are bulky, expensive and unwieldy. In order to conform to military hardening standards and to conserve weight, the display screen and user input devices (keyboard and touchpad) are affixed in a traditional workstation layout, but at a substantially reduced size. While typically featuring a touch screen, the interfaces are designed to be used with the presence of a full keyboard and mouse. All user feedback is visually presented through a small display screen yet some biometric capturing requires the screen to not be directly facing the user. As such, the user must split his or her focus between the collection device and the biometric subject, which can be dangerous in high-risk environments.

2) Typically for law enforcement, business and HR purposes, entire workstations are configured to handle the biometric enrollment process. Biometric peripherals are attached, typically via USB, to allow the workstation to collect all necessary biometrics for an enrollment. While the overall interface is similar, the capture process can vary for specific biometric collection devices. Navigating through the enrollment process is manually driven, forcing the user to spend a portion of the time merely clicking "next." Biometric quality feedback is typically limited to pass/fail rather than a quality gradient to delineate high quality biometrics from acceptable quality biometrics.

In today's fiscally constrained environment, biometric collection and enrollment remains a growing and burdensome security task for international, national, local and enterprise level organizations. Whether the collection is occurring in a high-risk war theatre setting or in a cooperative, low-risk setting (e.g., a new job applicant enrollment), cost effectiveness, efficiency and ease of use are crucial concerns to ensure proper adoption and use. For high risk environments (e.g., war theatre, border patrol, law enforcement, etc.), modern biometric capturing is typically performed with a relatively high cost and unintuitive device that requires extensive training and encumbrance. Similarly, cooperative biometric capturing tasks, like job applicant enrollment, are performed with costly, anchored workstations that feature archaic interfaces that extend capture time. In both instances, significant costs accrue from, e.g., in-person training, loss of productivity from a lengthy biometric enrollment, large helpdesk support and low end-user acceptance.

Current biometric enrollment systems results in unnecessary accrued costs. Costs accrue through, for example, the following unnecessary requirements:

1) Lengthy enrollment process: lack of automation and outmoded interfaces creates a tedious and unintuitive workflow;

2) Extensive training: hardware and software interfaces are non-standard and require in person training for effective usage. Any significant changes in hardware or software can require re-training;

3) Helpdesk support: with only a priori training, users need to be re-trained on activities if tasks are performed infrequently; and 4) Low user acceptance: difficult to use systems discourage use of biometric-enabled services which reduces ROI of those services.

What is needed is a system that provides intelligent automation of the biometric enrollment process in order to increase efficiency while reducing the training required for effective usage. What is needed is a system that increases worker efficiency and reduces worker training costs by providing an intuitive and user-friendly biometric enrollment process. What is needed is a system that increases biometric enrollment throughput by significantly reducing the length of time needed to perform a full biometric enrollment.

SUMMARY

Embodiments include a system and method that provide an automated biometric enrollment workflow (ABEW) that overcome the disadvantages of the prior art. For example, embodiments of ABEW system and method provide an intuitive, standardized interface for performing a biometric enrollment. Additionally, embodiments provide an intelligent automation of the biometric enrollment process that increases efficiency while reducing the training required for effective usage. Embodiments include system that increases worker efficiency and reduces worker training costs by providing an intuitive and user-friendly biometric enrollment process. Embodiments increase biometric enrollment throughput by significantly reducing the length of time needed to perform a full biometric enrollment.

These and other advantages are provided by an automated biometric enrollment workflow (ABEW) method implemented on a mobile communications device that includes a processor, memory and a display, the method executed by the processor and including opening of ABEW user interface (UI), initiating automated biometric enrollment workflow in which first biometric mode of the automated biometric enrollment workflow is started, a biometric sensor/scanner connected to mobile communications device scanning or reading a first biometric, wherein the first biometric is associated with the first biometric mode, analyzing the quality of the read/scanned first biometric, determining if the quality is sufficient, if the quality is insufficient, repeating the scanning/reading, analyzing and determining for the first biometric until the quality of the first biometric is sufficient and if the quality is sufficient, storing the first biometric.

These and other advantages are also provided by a system implementing an automated biometric enrollment workflow (ABEW) that includes a mobile communications device that includes a processor, memory and a display and one or more biometric sensor/scanners connected to the mobile communications device and configured to scan or read biometrics, wherein each biometric is associated with a biometric mode of the ABEW, in which the memory includes instructions for execution by the processor to perform the ABEW by opening of an ABEW user interface (UI) on the display of the mobile communications device, initiating automated biometric enrollment workflow in which first biometric mode of the automated biometric enrollment workflow is started, a first biometric sensor/scanner of the one or more biometric sensor/scanners connected to mobile communications device scanning or reading a first biometric, in which the first biometric is associated with the first biometric mode, analyzing the quality of the read/scanned first biometric, determining if the quality is sufficient, if the quality is insufficient, repeating the scanning/reading, analyzing and determining for the first biometric until the quality of the first biometric is sufficient, and if the quality is sufficient, storing the first biometric.

BRIEF DESCRIPTION OF THE DRAWINGS

Embodiments of an automated biometric enrollment workflow (ABEW) system and method are understood and described in conjunction with the following drawings, wherein:

Figure 1A:
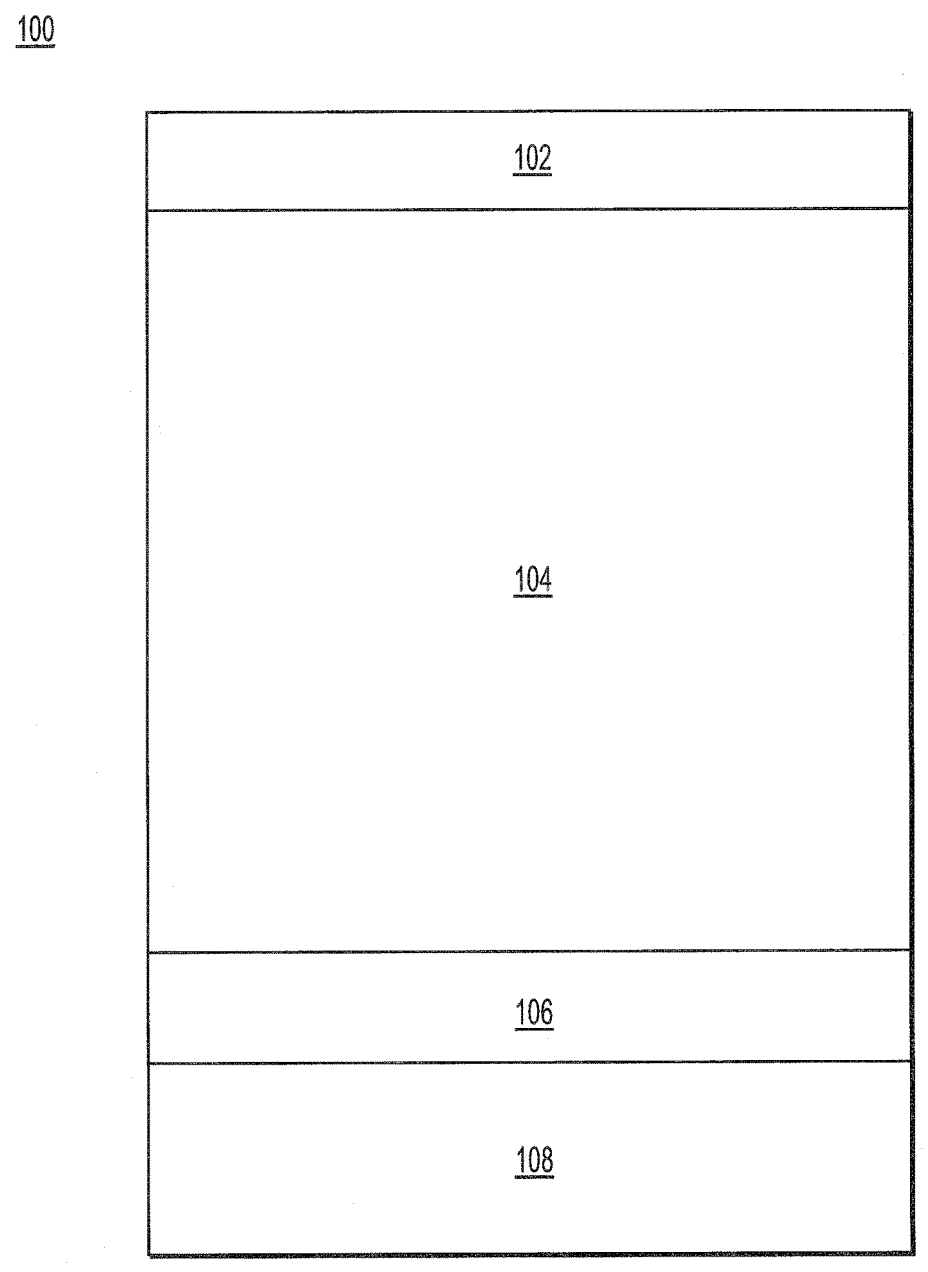

FIGS. 1A-1D are diagrams illustrating exemplary user interfacese of an embodiment of a ABEW system.

DETAILED DESCRIPTION

Figure 1B:
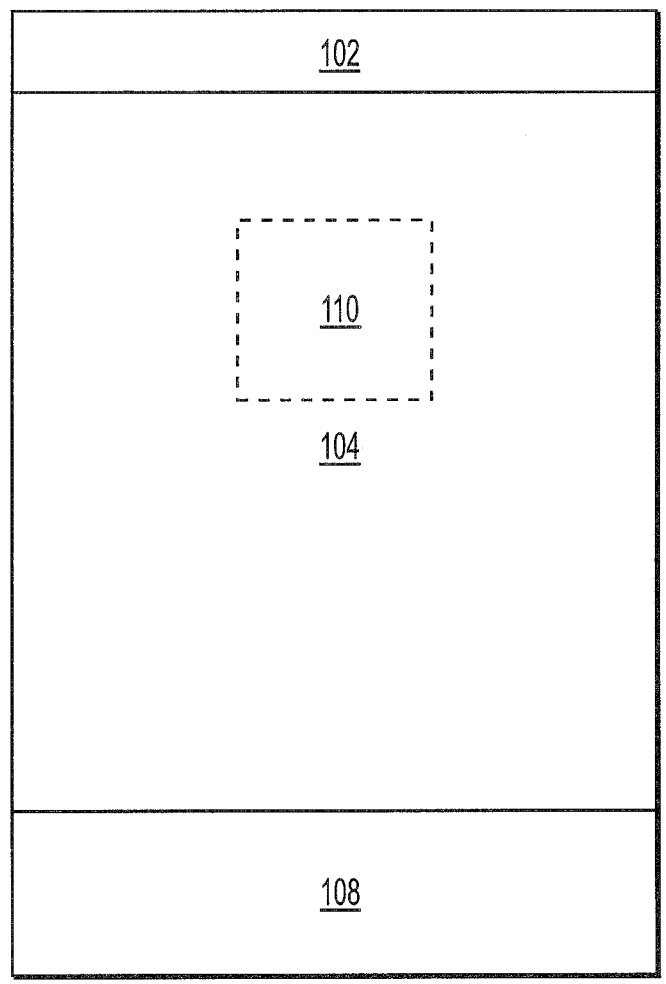

Described herein are embodiments of an automated biometric enrollment workflow (ABEW) system and method. Embodiments provide an intuitive, standardized interface for performing a biometric enrollment. Embodiments of the ABEW system and method utilize mobile computing strategies to provide a marked improvement in the biometric enrollment workflow. Utilizing multiple user feedback mechanisms, embodiments enables users to perform biometric capturing (e.g., of fingerprints, facial images, and irises) without needing to focus on device screen. Touch-based and gesture-based navigation, in conjunction with intelligent automated-navigation, allows users to perform full biometric enrollment using the least amount of manual navigation necessary. In order to ensure that the biometrics collected are of the best quality available, embodiments present a user with live biometric quality feedback. Embodiments of the ABEW system and method abstract the biometric capture process from the specific biometric capture device used to ensure that the process remains the same regardless of the attached biometric peripheral.

Embodiments increase worker efficiency and reduce worker training costs by providing an intuitive and user-friendly biometric enrollment process. Furthermore, biometric enrollment throughput can be increased using embodiments by significantly reducing the length of time needed to perform a full biometric enrollment.

Embodiments of the ABEW system provide intelligent automation of the biometric enrollment process in order to increase efficiency while reducing the training required for effective usage. The intelligent automation may be achieved through a standardization of the biometric capturing process that enables the task to be performed in the same manner regardless of biometric sensor. The ABEW system includes an application that resides on a mobile telecommunications device, e.g., a mobile smartphone (e.g., Android, iOS, Windows Mobile or Google operating system smartphones). The biometric sensors used may be incorporated into or with the mobile device or may include the mobile device's own input devices (e.g., cameras, microphone, etc.). The standardization further allows for the application to effectively navigate the user through the biometric collection task with minimum user effort.

Greater efficiency is also achieved through providing user feedback that can be acknowledged without needing to see the enrollment device screen (e.g., mobile device on which embodiments of ABEW system operate). As a result, an acclimated user can collect an entire biometric modality with a single click and no eyes on the screen. A biometric modality is the input of a biometric (e.g., fingerprints, face, iris) necessary to enroll the biometric. For example, fingerprint enrollment may involve the successful input of each fingerprint. Furthermore, with the inclusion of spoken commands, a user may perform an entire biometric enrollment with a single click on the mobile device to start the application.

Figure 1C:
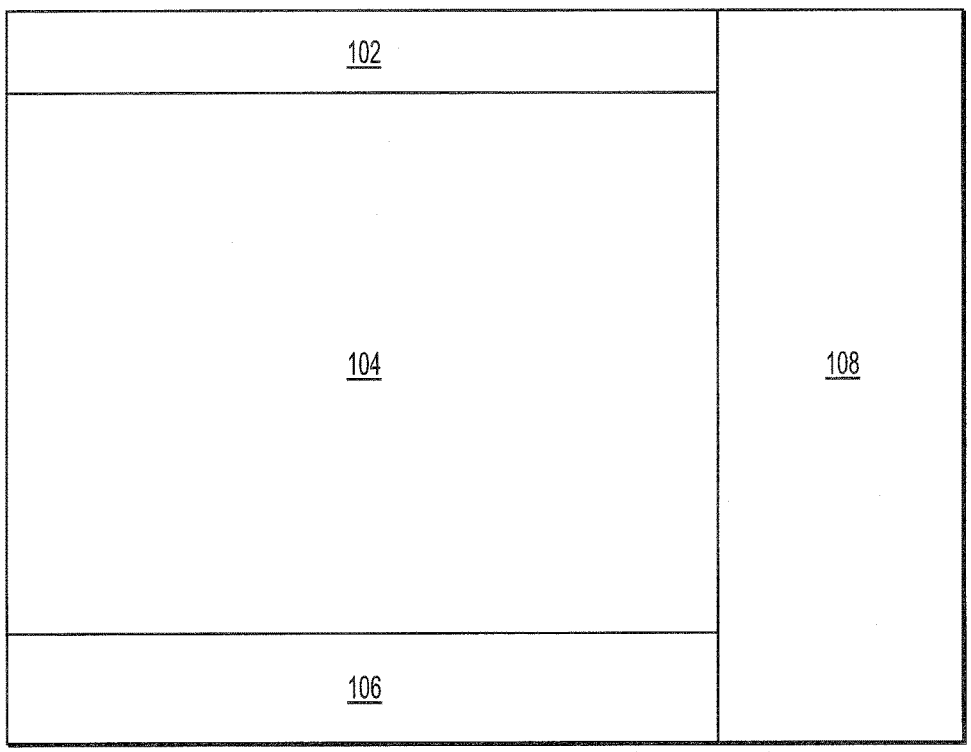
Figure 1D:
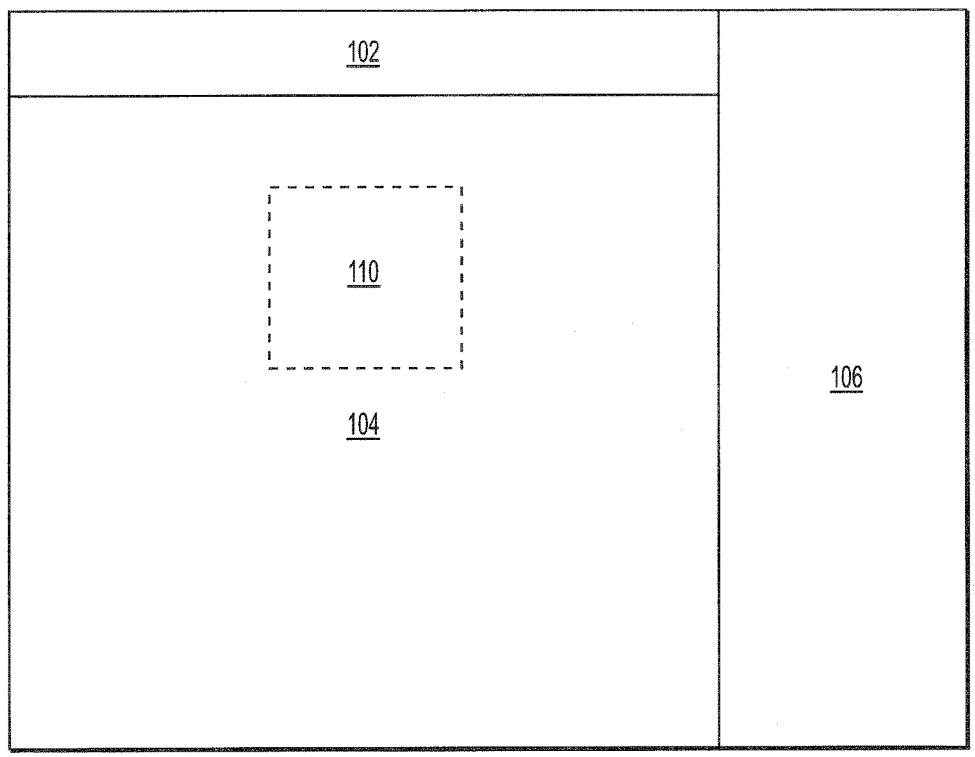

With reference to FIGS. 1A-1D, shown are embodiments of an ABEW workflow user interface (UI) 100 that provides a visual display of ABEW system workflow and visual feeback to a user of biometric capture status and quality. Embodiments of the ABEW system operate on mobile devices such as Android™ and Apple iOS™ devices. As such, ABEW UI 100 is displayed on a screen of mobile device which is connected to various biometric scanners (or is using built-in biometric scanners) and on which ABEW system runs. ABEW UI 100 shown in FIG. 1A is a portrait view or mode with a quality feedback heads-up display (HUD), ABEW UI 100 shown in FIG. 1B is a portrait view with a quality feedback overlay, ABEW UI 100 shown in FIG. 1C is a landscape view or mode with a quality feedback overlay and ABEW UI 100 shown in FIG. 1D is a landscape view or mode with a quality feedback HUD.

ABEW UI 100 includes textual user feedback display or interface 102, biometric capture preview display or interface 104, a visual quality feedback HUD or interface 106 and workflow navigational/status display or interface 108. With reference to FIG. 1B, visual quality feedback is provided in visual quality feedback overlay display 110 instead of a HUD. Overlay 110 may be positioned on top of biometric capture preview 104, e.g., as a semi-transparent watermark or an opaque display, or elsewhere on ABEW UI 100. Landscape ABEW UI 100, as shown in FIGS. 1C and 1D, respectively, may include a visual quality feedback HUD 106 or visual quality feedback overlay 110.

With continuing reference to FIGS. 1A-1D, in embodiments, textual user feedback display 102 provides textual instructions and/or descriptions regarding the current state of the ABEW system workflow. For example, these instructions and descriptions may indicate the biometric position relative to the device, instructions to the user describing steps to take to capture the relevant biometric (i.e., the biometric being captured in the current state of the ABEW system workflow (each state of the workflow corresponds to the capture and/or processing of a certain biometric)) and the actual state or status of the workflow. These textual instructions may also be output as audio instructions through the mobile device. Biometric capture preview 104 displays the current biometric image. During capture, biometric capture preview 104 displays the view of the biometric scanner connected to the mobile device on which ABEW system runs. After a biometric image has been captured by the biometric scanner, the image may be placed into storage (e.g., the biometric scanner or mobile device memory). Biometric capture preview 104 may display the captured biometric image in storage. Alternatively, biometric capture preview 104 may display the current live view of the biometric scanner.

Visual quality feedback HUD 106 and visual quality feedback overlay 110 each provide a visual indicator or indication of the quality of the biometric image being captured or most recently captured (i.e., in storage). For facial images, overlay 110 may highlight the perceived face in the overall image shown on biometric capture preview 104 and provide quality details in the overlay 110. For fingerprints and irises, HUD 106 may display quality information along bottom of the captured image displayed in biometric capture preview 104. In embodiments, the visual quality may be rated and displayed as GOOD, OK, POOR or NONE (see below).

With continuing reference to FIGS. 1A-1D, navigational/status display 108 may provide a visual indicator or indication of the full complement of the biometric modality (i.e., the entire biometric enrollment workflow for a given biometric and all of the biometrics being processed by ABEW system). An item may be included for each individual biometric and display 108 may include text or an icon (or other graphic) indicator of the biometric position (on the body) as well as a visual indication of the status/presence of the biometric capture (e.g., present, missing or currently capturing). In this manner, navigational/status display 108 enables a user to understand where he/she is in the automated biometric enrollment process (workflow). Additionally, ABEW UI 100 may provide auditory or tactile (e.g., vibrations) feedback on the navigation/status in the automated biometric enrollment process (workflow). For example, ABEW UI 100 may provide audio instructions describing next step in the process or indicating results of current biometric capture (e.g., success, failure, good, ok or poor quality, etc.). Likewise, ABEW UI 100 may vibrate to indicate a biometric is successfully captured.

User may start the automated biometric enrollment workflow by clicking on the ABEW UI 100 (e.g., on start icon on navigational/status display 108). When in automated mode, ABEW UI 100 will provide instructions for each biometric modality (e.g., through textual user feedback display 102 and/or audio instructions), display live view of biometric input (e.g., biometric capture preview display or interface 104), provide immediate quality feedback (e.g., through visual quality feedback HUD or interface 106) and automatically advance to next biometric modality, or completion of biometric enrollment if complete, when satisfactory biometric input received, as indicated on, e.g., workflow navigational/status display or interface 108.

As described below ABEW UI 100 may also include various screens, e.g., menus, useful to provide information and make choices relevant to the automated biometric enrollment workflow. For example, such menus may include ephermal menus that are accessed through a touch and gesture (e.g., slide) movement that causes the menu to slide out and overlay the ABEW UI 100, or portions of the ABEW UI 100.

As understood by the above description with reference to FIGS. 1A-1D, embodiments of the ABEW system combine disparate mobile device UI mechanics to provide an intuitive ABEW workflow that mitigates the need for training users on system usage or biometric capturing. Many emerging mobile UI techniques are so prevalent amongst mobile device applications that most users will have intimate experience with such techniques. By merging these UI techniques into a single delivery, e.g., ABEW UI 100, mobile device users will instantaneously understand how to navigate the workflow. In embodiments, an ever-present biometric quality feedback HUD or overlay not only ensures that biometric captures are of the highest quality but, through passive reinforcement, ensures users will intuitively learn how to capture quality biometrics without needing to understand the mechanics of biometric identification Embodiments of the ABEW system may operate similarly to current biometric enrollment software on dedicated biometric collection devices. Among the areas in which embodiments of the ABEW system differ is in the user interface (UI) and user feedback enhancements, described above, as well as operating on mobile devices instead of dedicated biometric collection devices. As described above, embodiments of the ABEW system operate on mobile devices such as Android™ and Apple iOS™ devices. By utilizing emerging mobile computing strategies, the ABEW system provides a faster, easier-to-use biometric enrollment system that reduces training time and enhances the quality of biometric captures. Specifically, embodiments of the ABEW system features specific designs to achieve these goals: 1) focus-free capturing; 2) least-touches necessary navigation; and 3) concurrent quality feedback.

1) An ABEW biometric capture workflow implemented by embodiments of the ABEW system allows a user to capture a subject's biometric and biographic data while focusing on the subject and not the enrollment device. In embodiments, the capturing of all biometric modalities (e.g., fingerprints, face, and irises) is managed using the same, standardized workflow (e.g., presented through ABEW UI 100 described above). The workflow presents a live view of the biometric sensor's input (e.g., biometric capture preview 104), a navigational overview with a status overlay (navigational/status display 108) and a live biometric quality feedback HUD or overlay (e.g., visual quality feedback HUD 106 or visual quality feedback overlay 110). In addition to the visual feedback, embodiments of the ABEW system may present the user with auditory feedback in the form of Text-to-Speech instructions and audio cues as well as tactile feedback through vibration functionality.

The standardized interface (e.g., ABEW UI 100) ensures that, regardless of modality, the user will always follow the same procedure and, therefore, not need to continually check for directions. The robust user feedback ensures that the user does not need to focus on the biometric capture device to perform the capture. Typically, ABEW utilizes Text-to-Speech functionality to provide instructional directions to the user, as the user performs his/her tasks. In embodiments, instructions include the current biometric capture desired (e.g., left iris or rolled right thumb print), the state of the capture (e.g., success, failure, error) and contextual directions (e.g., move sensor closer to subject, edge detected begin rolling finger, please connect fingerprint sensor). The modularity of the Text-to-Speech engine allows for spoken directions to be provided in the user's native tongue, providing the proper data libraries are present and the mobile device on which ABEW system is installed. In situations where spoken directions are not desired, feedback can still be provided using auditory cues (e.g., a sequence of beeps or specific tones) or, if silence is necessary, the device can use specific vibration patterns to indicate the above signals.

2) An ABEW biometric capture workflow implemented by embodiments of the ABEW system expedites the overall biometric enrollment process and increases user acceptance through simplified task navigation. When a user first opens the capture process for a specific modality, the ABEW assesses the current state of this modality's enrollment. If the ABEW detects that this modality is incomplete, the ABEW will initiate the capture process at the first necessary biometric capture. Upon a successful capture, the ABEW will move the user onto the next biometric capture (e.g., through auditory cues and instructions and navigational/status display 108). The capture of an entire biometric modality can be performed with only a single click to open the modality (e.g., through navigational/status display 108). Once all required biometrics have been captured, the automated navigation disengages to allow the user to manually navigate as necessary. Should the user navigate to an already present biometric capture, the automated mode will temporarily disengage though it will be engaged again if the user navigates to a currently missing biometric position (e.g., through navigational/status display 108).

Typically, a biometric enrollment will expect a user to capture the full biometric signature of a subject. However, a subject may have (a) physical condition(s), such as an amputation or bandaging, that prevent the full capturing. While progressing through the automated capture through ABEW IO 100, a user may simply skip a current biometric (e.g., by swiping the screen from right to left to skip the current biometric position). In embodiments, ABEW IO 100 automatically annotates the skipped biometric position as amputated/bandaged, rather than requiring manual navigation. If the biometric is unable to be captured for another reason, the user may select the specific biometric position or mode and change the annotation manually. In addition, the user may navigate between biometric positions using the same swiping mechanism.

In embodiments of ABEW JO 100, users may quickly navigate between different modalities (and other biometric enrollment requirements) using advanced touch and gesture navigation. For example, if the user slides his/her finger from the left-most edge of the screen, an ephemeral menu may be pulled out that lists the various modalities that comprise the biometric enrollment. This menu may display and allow the user to quickly view the status of each individual modality. If the user releases his/her touch on a specific menu item, the capture workflow may transfer to the selected modality. Alternatively, if the user releases his/her touch on another part of the screen, the menu may slide back to closed and allow the user to progress in the current modality uninterrupted. This quick view can even be engaged while the user is performing a biometric capture and not interrupt the process.

Beyond touch based navigation, in embodiments of the ABEW system, the user may issue any navigational or data entry commands using spoken commands. By utilizing a Speech-to-Text engine, the user's spoken directions can be interpreted into the same commands that would be given with a touch or gesture (or entered textually). By mapping specific instructions to common phrases and by selecting for specific words amongst a phrase, a user may be able to use intuitive spoken commands without requiring extensive prior training. Ultimately, through spoken commands and spoken/auditory feedback, a user may perform almost all of the biometric enrollment process without touching or seeing the application screen.

3) Ensuring quality biometric captures is a critical requirement as higher quality enhances accuracy, which is critical to any biometric identification system. Understanding the degree of quality of a biometric capture requires an understanding of the specific biometric in question, which typically requires the users to be trained in biometric analysis. Embodiments of the ABEW system incorporate concurrent biometric quality analysis and feedback over the entire capture process to mitigate the user domain expertise requirement. For simplicity, in embodiments of ABEW system, the user is presented (e.g., through visual quality feedback HUD 106 and visual quality feedback overlay 110) with four degrees of quality: None (no biometric detected), Poor (detected biometric is below the required minimum quality threshold), OK (detected biometric meets the minimum quality threshold but falls below a high quality biometric) and Good (detected biometric is of high quality).

In embodiments of ABEW system, while the user is actively capturing a specific biometric, the live-feed (e.g., displayed on biometric capture preview 104) is processed by a quality analysis tool and the result is visually reported through a quality display (e.g., visual quality feedback HUD 106 and visual quality feedback overlay 110). ABEW system ensures that all biometric captures are assisted through this quality metric and, as a result, will not automatically capture sub-standard biometrics. Embodiments of ABEW system will, at first, only accept biometrics of "Good" quality. After a defined timeout period, an "OK" quality biometric will be accepted. After a secondary defined timeout, the user may be permitted to perform a manual capture of a "Poor" quality biometric. Should the user initiate this manual capture, the biometric may be automatically annotated as a manual capture due to sub-standard biometric quality. As a user acclimates to the capture process, the quality feedback mechanism will, effectively, train the user how to capture high quality biometric images through hands on reinforcement.

Figure 2:
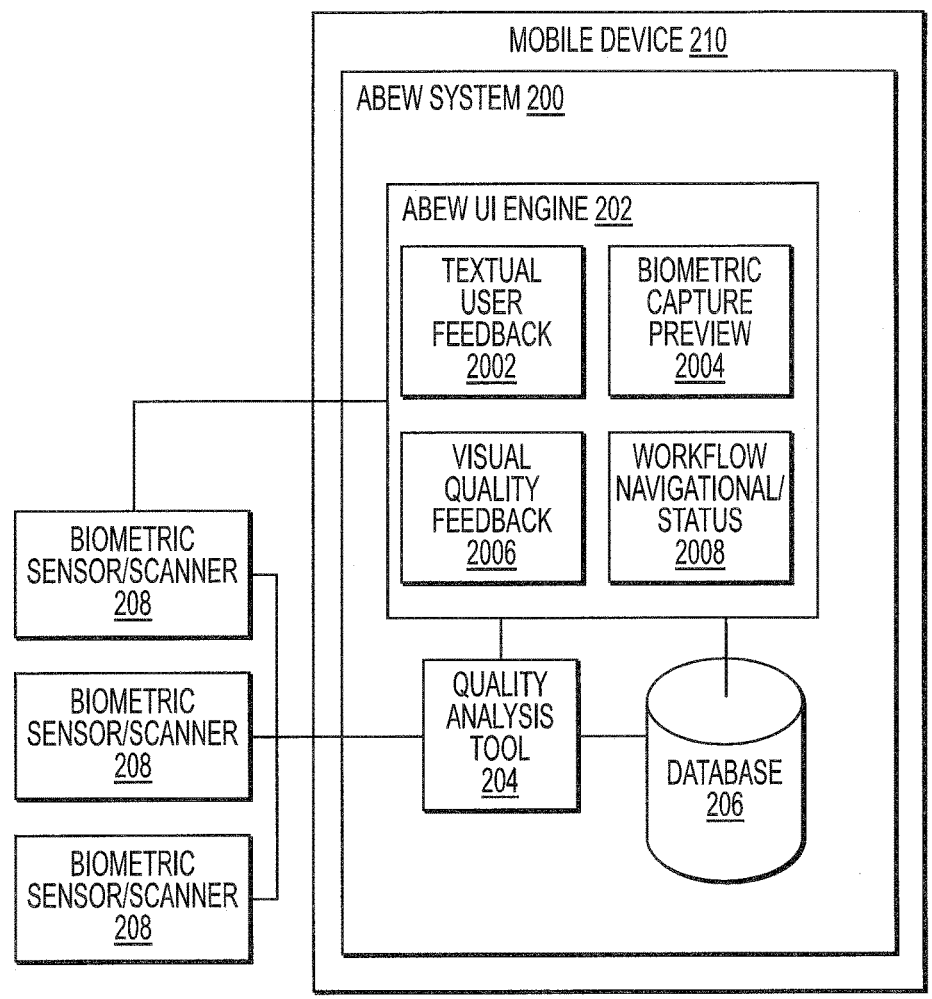
FIG. 2 is a block diagram illustrating an exemplary architecture of an embodiment of a ABEW system.

With reference now to FIG. 2, shown is an architectural block diagram illustrating an exemplary architecture of an embodiment of ABEW system 200. As shown, ABEW system 200 may include the following components: ABEW UI engine 202, quality analysis tool 204 and database 206. ABEW UI engine 202 generates ABEW UI, e.g., ABEW UI 100 described above with respect to FIGS. 1A-1D. ABEW UI engine 202 may be implemented as an application or other software program running on mobile device 210. ABEW UI engine 202 may include textual user feedback component/module 2002, biometric capture preview component/module 2004, visual quality feedback component/module 2006 and workflow navigation/status component/module 2008. These components 2002-2008 may be perform the corresponding functions and generate the display of the corresponding textual user feedback display or interface 102, biometric capture preview display or interface 104, a visual quality feedback HUD or interface 106 or overlay 110, and workflow navigational/status display or interface 108, respectively, and may be implemented as separate sub-modules within ABEW UI engine 202 application or other sub-components of ABEW UI engine 202. ABEW UI engine 202 may utilize mobile device text-to-voice and other auditory and vibratory capabilities to generate voice instructions, auditory tones and vibrations, e.g., described above, consistent with automated biometric enrollment workflow. Alternatively, ABEW UI engine 202 may include separate programming to enable and generate such voice instructions, auditory tones and vibrations.

Mobile device 210 may include one or more associated biometric sensors/scaners 208. ABEW system 200 may include instructions for directing each biometric sensor/scanner 208 to read/scan the appropriate biometric (e.g., fingerprint, face or iris). The instructions may be included within ABEW IO engine 202, more specifically within a sub-module, such as workflow navigation/status component/module 2008. The instructions may direct biometric sensor/scanner 208 to read/scan the biometric repeatedly until appropriate quality biometric is obtained. Biometric sensor/scanner 208 may output read/scanned biometric to quality analysis tool 204. Quality analysis tool 204 may use known algorithms, metrics and comparisons to sample biometrics to analyze received biometric and determine the quality of the biometric. Quality analysis tool 204 may output determined quality to ABEW JO engine 202. For example, quality analysis tool 204 may be output to visual quality feedback component/module 2006 so that visual quality feedback component/module 2006 may generate visual quality feedback HUD or interface 106 or overlay 110. Quality analysis tool 204 may also output quality analysis to workflow navigation/status component/module 2008, which may use analysis to determine whether to accept currently read/scanned biometric and to move to next step in biometric enrollment workflow. If ABEW system 200 determines a read biometric meets quality requirements (see above), ABEW system 200 may instruct storage of biometric in database 206. Database 206 may also include a description of ABEW use, which may be updated (e.g., to reflect additional biometrics, new biometric scanners/sensors 208 and new biometric scanner/sensor capability.

Figure 3:
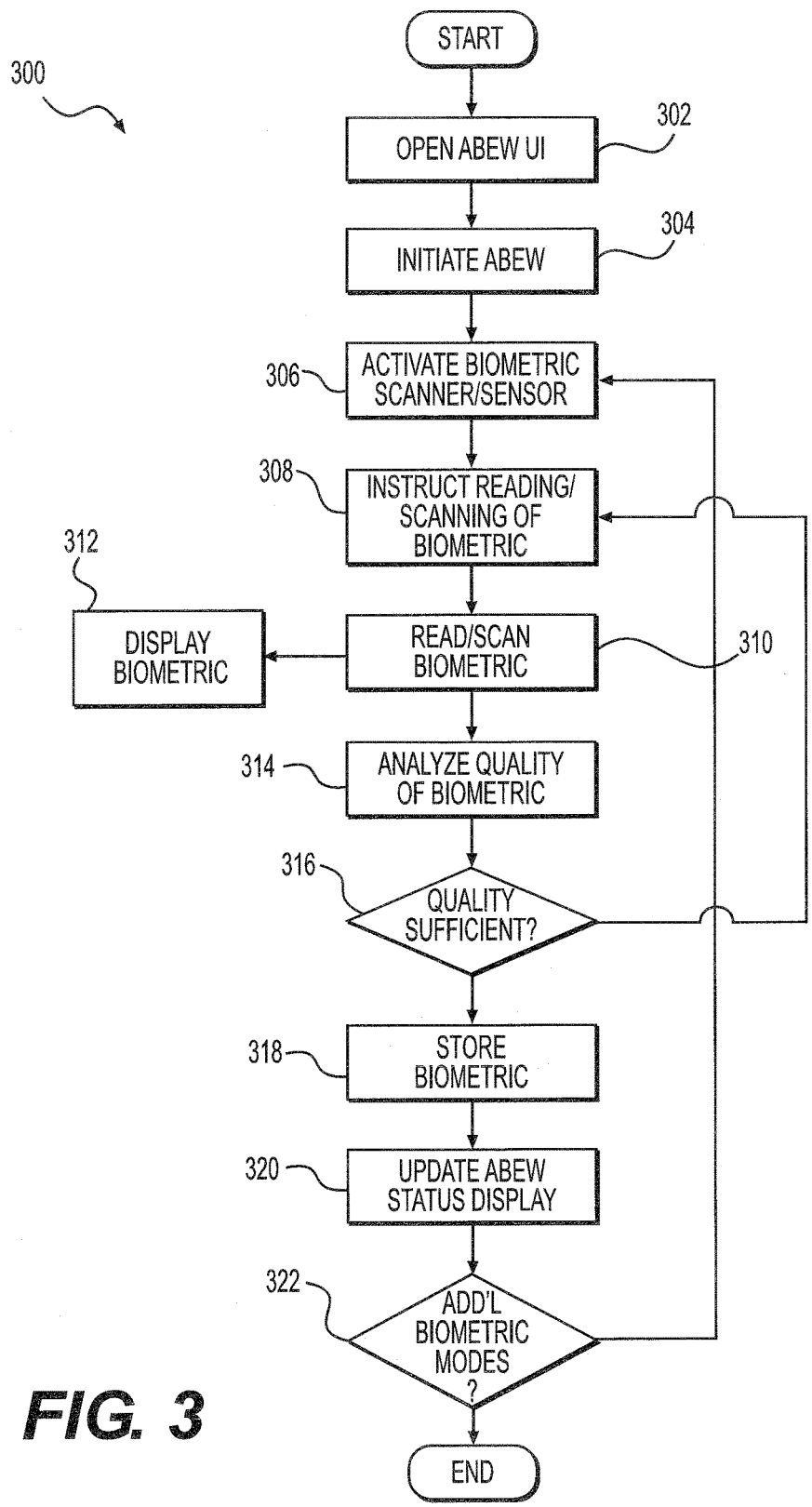
FIG. 3 is a flowchart illustrating an embodiment of ABEW method.

With reference now to FIG. 3, shown is a flowchart illustrating an embodiment of a method 300 for automated biometric enrollment work flow. Method 300 may start with opening of ABEW UI, block 302. A user may cause the opening or starting 302 of ABEW UI 100 by selecting an ABEW UI icon displayed on mobile device screen. ABEW UI may initiate automated biometric enrollment workflow (ABEW), block 304. ABEW UI may initiate ABEW 304 in response to, e.g., user selecting start icon of ABEW on workflow navigational/status display or interface 108, through a voice command, selection of start of ABEW on emphermal menu or other standard mobile device interface means. ABEW UI may activate a biometric sensor/scanner associated with mobile device and appropriate for first biometric mode in ABEW, block 306. ABEW system may instruct the reading/scanning of the biometric, block 308. This instructing 308 may include instructing the biometric sensor/scanner to read or scan first biometric. However, this instructing 308 may also include instructing the user where the biometric position is, how to hold the mobile device and the associated biometric scanner/reader, etc. Such instructing 308 may be provided textually, e.g., through textual user feedback display or interface 102, or through audio/voice. Biometric sensor/scanner may read or scan the biometric, block 310. Live view of biometric so scanner or read may be displayed, block 312, e.g., on biometric capture preview display or interface 104.

Biometric quality analysis tool may analyze the quality of the read/scanned biometric, block 314. ABEW system may determine if biometric is of sufficient quality, block 316. For example, embodiments of ABEW system will, at first, only accept biometrics of "Good" quality. After a defined timeout period, an "OK" quality biometric will be accepted. After a secondary defined timeout, the user may be permitted to perform a manual capture of a "Poor" quality biometric. Consequently, if first scan/read of biometric is determined 316 to not be good, method 300 may re-read/scan 310 the biometric. Method 300 may include providing instructions 308 again.

With continued reference to FIG. 3, once read/scanned biometric is considered to be of sufficient quality, the biometric is stored, block 318. Display of ABEW (e.g., workflow navigational/status display or interface 108) is updated, block 320. Updated display of ABEW may demonstrate/indicate which the current status of the ABEW. Method 300 determines whether there are any additional biometric modes to be processed in ABEW, block 322. If there are additional biometric modes, method 300 may activate 306 additional biometric sensor/scanner corresponding to additional biometric to be enrolled. If no additional biometric modes, automated biometric enrollment is complete.

The method 300, and the elements of method 300 described herein, may be implemented by instructions stored in memory and executed by processor of mobile device. In other words, method 300 may be implemented by application or software, such as ABEW system 200 described above with reference to FIG. 2.

Figure 4:
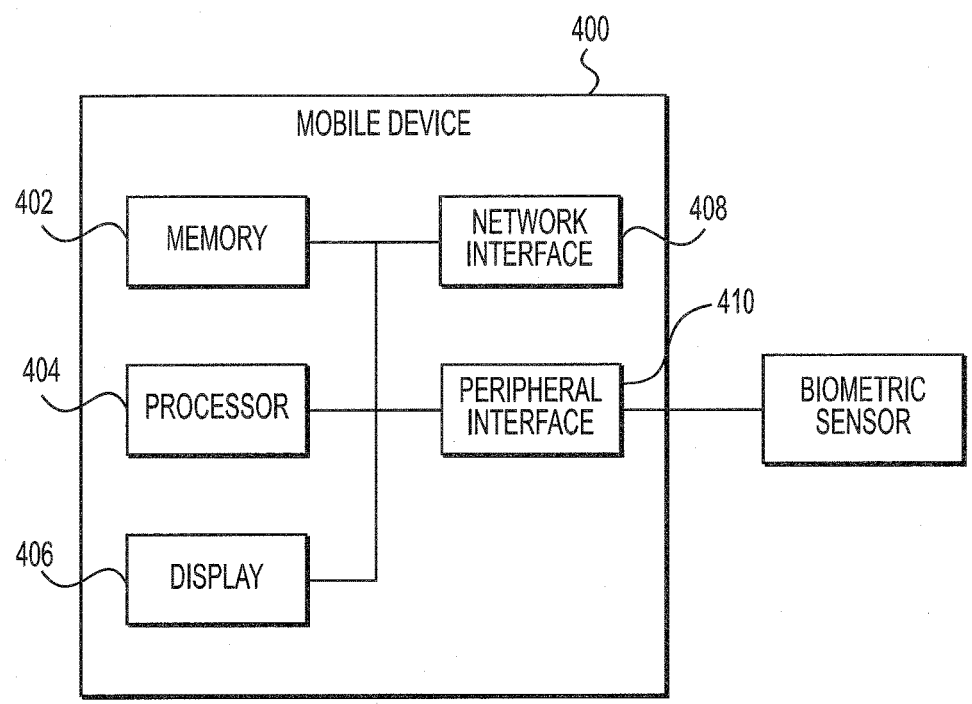
FIG. 4 is a block diagram illustrating exemplary hardware components of an embodiment of a ABEW system.

With reference now to FIG. 4, shown is exemplary computer system components of an embodiment of ABEW system. Mobile device 400 typically includes a memory 402, processor 404, a display device 406, peripheral connection 408, a network connection 410 and additional output device 412. Memory 402 may include FLASH, RAM or similar types of memory, and may host or store instructions embodied as one or more applications (e.g., applications necessary to provide ABEW system 200, and its components, and ABEW JO 100) for execution by processor 404. Processor 404 executes the applications which are stored in memory 402, or received from the Internet or other network. Peripheral connection 408 may connect mobile device 400 to one or more peripherals, such as biometric scanners/readers. Such peripherals may be physically connected or attached to mobile device 400, e.g., through a holster or harness. Network connection 410 may include any type of connection for connecting to networks, including wi-fi and cellular networks. Network connection 410 may enable ABEW system 200 to transmit biometric enrollment data to remote servers.

Mobile device 400 may store a database in memory 402, for example, for storing and maintaining information need or used by the applications described herein. Also, processor 404 may execute one or more software applications in order to provide the functions described in this specification, specifically in the method described above, and the processing may be implemented in software, such as software modules, for execution by processors. The processing may provide and support web pages and other graphical user interfaces, such as ABEW UI 100 described above. The user interfaces may be displayed on display device 406 of mobile device 400. Audio instructions, tones and vibrations may be output through output device 412, such as speaker or vibration device.

Although mobile device 400 is depicted with various components, one skilled in the art will appreciate that mobile device 400 can contain additional or different components. In addition, although aspects of an implementation consistent with the above are described as being stored in memory, one skilled in the art will appreciate that these aspects can also be stored on or read from other types of computer program products or computer-readable media, such as memory. The computer-readable media may include instructions for controlling a computer system, such as mobile device 400, to perform a particular method.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. An automated biometric enrollment workflow (ABEW) method implemented on a mobile communications device that includes a processor, memory and a display, the method executed by the processor and comprising:

opening of an ABEW user interface (UI);
initiating automated biometric enrollment workflow in which first biometric mode of the automated biometric enrollment workflow is started;
displaying on a display a live view of a first biometric;
a biometric sensor/scanner connected to mobile communications device scanning or reading the first biometric, wherein the first biometric is associated with the first biometric mode;
providing audio instructions, the audio instructions including a current biometric capture desired, a state of the current biometric capture, and contextual directions;
analyzing the quality of the read/scanned first biometric;
determining if the quality is sufficient;
if the quality is insufficient, repeating the scanning/reading, analyzing and determining for the first biometric until the quality of the first biometric is sufficient; and
if the quality is sufficient, storing the first biometric,
wherein if the quality of the first biometric remains insufficient after repeating the scanning/reading, analyzing and determining over a period of time, the quality required to be sufficient is incrementally reduced and the method further comprises repeating the scanning/reading, analyzing and determining for the first biometric, and
wherein the incremental reduction results in multiple permissible reduced-quality degrees that include at least one automatically captured reduced-quality degree and at least one manually captured reduced-quality degree.

2. The ABEW method of claim 1 wherein storing the first biometric completes the first biometric mode, the method further comprising determining if there are additional biometric modes in the automated biometric enrollment workflow.

3. The ABEW method of claim 2 wherein if there are additional biometric modes, the method further comprising:
a biometric sensor/scanner connected to mobile communications device scanning or reading a second biometric, wherein the second biometric is associated with a second biometric mode;
analyzing the quality of the read/scanned second biometric;
determining if the quality is sufficient;
if the quality is insufficient, repeating the scanning/reading, analyzing and determining for the second biometric until the quality of the second biometric until the quality is sufficient; and
if the quality is sufficient, storing the second biometric.

4. The ABEW method of claim 3 wherein storing the second biometric completes the second biometric mode, the method further comprising determining if there are additional biometric modes in the automated biometric enrollment workflow.

5. The ABEW method of claim 4 wherein if there are additional biometric modes, the method further comprising:
a biometric sensor/scanner connected to mobile communications device scanning or reading a third biometric, wherein the third biometric is associated with a third biometric mode;
analyzing the quality of the read/scanned third biometric;
determining if the quality is sufficient;
if the quality is insufficient, repeating the scanning/reading, analyzing and determining for the third biometric until the quality of the third biometric until the quality is sufficient; and
if the quality is sufficient, storing the third biometric.

6. The ABEW method of claim 1 further comprising displaying the scanned/read first biometric on the display of the mobile communications device.

7. The ABEW method of claim 1 further comprising updating a workflow status display on the display of the mobile communications device.

8. The ABEW method of claim 1 further comprising activating a biometric sensor/scanner connected to mobile communications device, wherein the activated biometric sensor/scanner is associated with first biometric to be read during first biometric mode.

9. The ABEW method of claim 1 further comprising instructing the scanning/reading of the first biometric.

10. A system implementing an automated biometric enrollment workflow (ABEW) comprising:
a mobile communications device that includes a processor, memory and a display; and
one or more biometric sensor/scanners connected to the mobile communications device and configured to scan or read biometrics, wherein each biometric is associated with a biometric mode of the ABEW;
wherein the memory includes instructions for execution by the processor to perform the ABEW by:
opening of an ABEW user interface (UI) on the display of the mobile communications device;
initiating automated biometric enrollment workflow in which first biometric mode of the automated biometric enrollment workflow is started;
displaying on a display a live view of a first biometric;
a first biometric sensor/scanner of the one or more biometric sensor/scanners connected to mobile communications device scanning or reading the first biometric, wherein the first biometric is associated with the first biometric mode;
providing audio instructions, the audio instructions including a current biometric capture desired, a state of the current biometric capture, and contextual directions;
analyzing the quality of the read/scanned first biometric;
determining if the quality is sufficient;
if the quality is insufficient, repeating the scanning/reading, analyzing and determining for the first biometric until the quality of the first biometric is sufficient; and
if the quality is sufficient, storing the first biometric,
wherein if the quality of the first biometric remains insufficient after repeating the scanning/reading, analyzing and determining over a period of time, the quality required to be sufficient is incrementally reduced and the instructions further comprises instructions for repeating the scanning/reading, analyzing and determining for the first biometric, and
wherein the incremental reduction results in multiple permissible reduced-quality degrees that include at least one automatically captured reduced-quality degree and at least one manually captured reduced-quality degree.

11. The system of claim 10 wherein storing the first biometric completes the first biometric mode, the memory further including instructions for determining if there are additional biometric modes in the automated biometric enrollment workflow.

12. The system of claim 11 wherein if there are additional biometric modes the one or more biometric sensor/scanners include a second biometric sensor/scanner connected to mobile communications device configured to scan or read a second biometric, wherein the second biometric is associated with a second biometric mode, and the memory further includes instructions for:

analyzing the quality of the read/scanned second biometric;

determining if the quality is sufficient;

if the quality is insufficient, repeating the scanning/reading, analyzing and determining for the second biometric until the quality of the second biometric until the quality is sufficient; and if the quality is sufficient, storing the second biometric.

13. The system of claim 12 wherein storing the second biometric completes the second biometric mode, the memory further including instructions for determining if there are additional biometric modes in the automated biometric enrollment workflow.

14. The system of claim 13 wherein if there are additional biometric modes, wherein if there are additional biometric modes the one or more biometric sensor/scanners include a third biometric sensor/scanner connected to mobile communications device configured to scan or read a third biometric, wherein the third biometric is associated with a third biometric mode, and the memory further includes instructions for:

analyzing the quality of the read/scanned third biometric;

determining if the quality is sufficient;

if the quality is insufficient, repeating the scanning/reading, analyzing and determining for the third biometric until the quality of the third biometric until the quality is sufficient; and if the quality is sufficient, storing the third biometric.

15. The system of claim 10 wherein the memory further includes instructions displaying the scanned/read first biometric on the display of the mobile communications device.

16. The system of claim 10 wherein the memory further includes updating a workflow status display on the display of the mobile communications device.

17. The system of claim 10 wherein the memory further includes activating a biometric sensor/scanner connected to mobile communications device, wherein the activated biometric sensor/scanner is associated with first biometric to be read during first biometric mode.

18. The system of claim 10 wherein the memory further includes instructing the scanning/reading of the first biometric.

* * * * *